(12) United States Patent
Yoshida et al.

(10) Patent No.: US 6,437,870 B1
(45) Date of Patent: Aug. 20, 2002

(54) FACSIMILE APPARATUS HAVING V.8 PROTOCOL FACILITY AND FACSIMILE COMMUNICATION METHOD

(75) Inventors: Takehiro Yoshida, Tokyo; Toru Maeda, Mitaka; Toshio Kenmochi, Fujisawa; Kaori Nakagawa, Yokohama, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/797,666

(22) Filed: Jan. 31, 1997

(30) Foreign Application Priority Data

Feb. 1, 1996 (JP) ............................................. 8-016598

(51) Int. Cl.⁷ .......................... G06F 13/00; H04N 1/00; H04N 1/32
(52) U.S. Cl. ....................... 358/1.15; 358/434; 358/442
(58) Field of Search ................................ 358/438, 434, 358/435, 436, 439, 440, 404, 442, 407, 468, 400, 405, 406; 379/93.31, 100.01, 100.06, 100.15, 106.01

(56) References Cited

U.S. PATENT DOCUMENTS

| | | | | |
|---|---|---|---|---|
| 4,897,831 A | | 1/1990 | Negi et al. ..................... 370/29 |
| 5,404,394 A | * | 4/1995 | Dimolitsas et al. ......... 379/100 |
| 5,442,686 A | * | 8/1995 | Wada et al. ................... 379/88 |
| 5,721,731 A | * | 2/1998 | Yoshida ....................... 370/296 |
| 5,726,765 A | * | 3/1998 | Yoshida ....................... 358/434 |
| 5,732,104 A | * | 3/1998 | Brown et al. ................ 375/222 |
| 5,751,441 A | * | 5/1998 | Morimoto .................... 358/435 |
| 5,812,281 A | * | 9/1998 | Mukai et al. ................ 358/435 |
| 5,847,842 A | * | 12/1998 | Maeda ......................... 358/434 |
| 5,890,806 A | * | 4/1999 | Yoshida ................. 379/100.06 |

FOREIGN PATENT DOCUMENTS

| | | |
|---|---|---|
| EP | 0 724 355 A2 | 7/1996 |
| JP | 07-298024 | * 11/1995 |
| JP | 07-298027 | * 11/1995 |

OTHER PUBLICATIONS

Patent Abstracts of Japan, vol. 1996, No. 03, Mar. 29, 1996, JP 07 298024 A.
Patent Abstracts of Japan, vol. 1996, No. 03, Mar. 29, 1996, JP 07 298027 A.
Patent Abstracts of Japan, vol. 1996, No. 04, Apr. 30, 1996, JP 07 322037 A.

* cited by examiner

Primary Examiner—Madeleine Nguyen
(74) Attorney, Agent, or Firm—Fitzpatrick, Cella, Harper & Scinto

(57) ABSTRACT

A CI signal of a V.8 protocol is transmitted in response to the reception of a DIS signal indicating the provision of a V.8 facility, and the V.8 protocol is executed in response to the reception of an ANSam signal of V.8, and when the DIS signal indicating the provision of the V.8 facility is received without receiving the ANSam signal, the CI signal is retransmitted. When a transmitting station or a receiving station does not have a V.34 facility after the V.8 protocol, the DIS signal indicating the non-provision of the V.8 facility is transmitted. Thus, when the V.8 protocol facility is provided with a facsimile apparatus, communication with a conventional apparatus having only a T.30 protocol is attained.

30 Claims, 15 Drawing Sheets

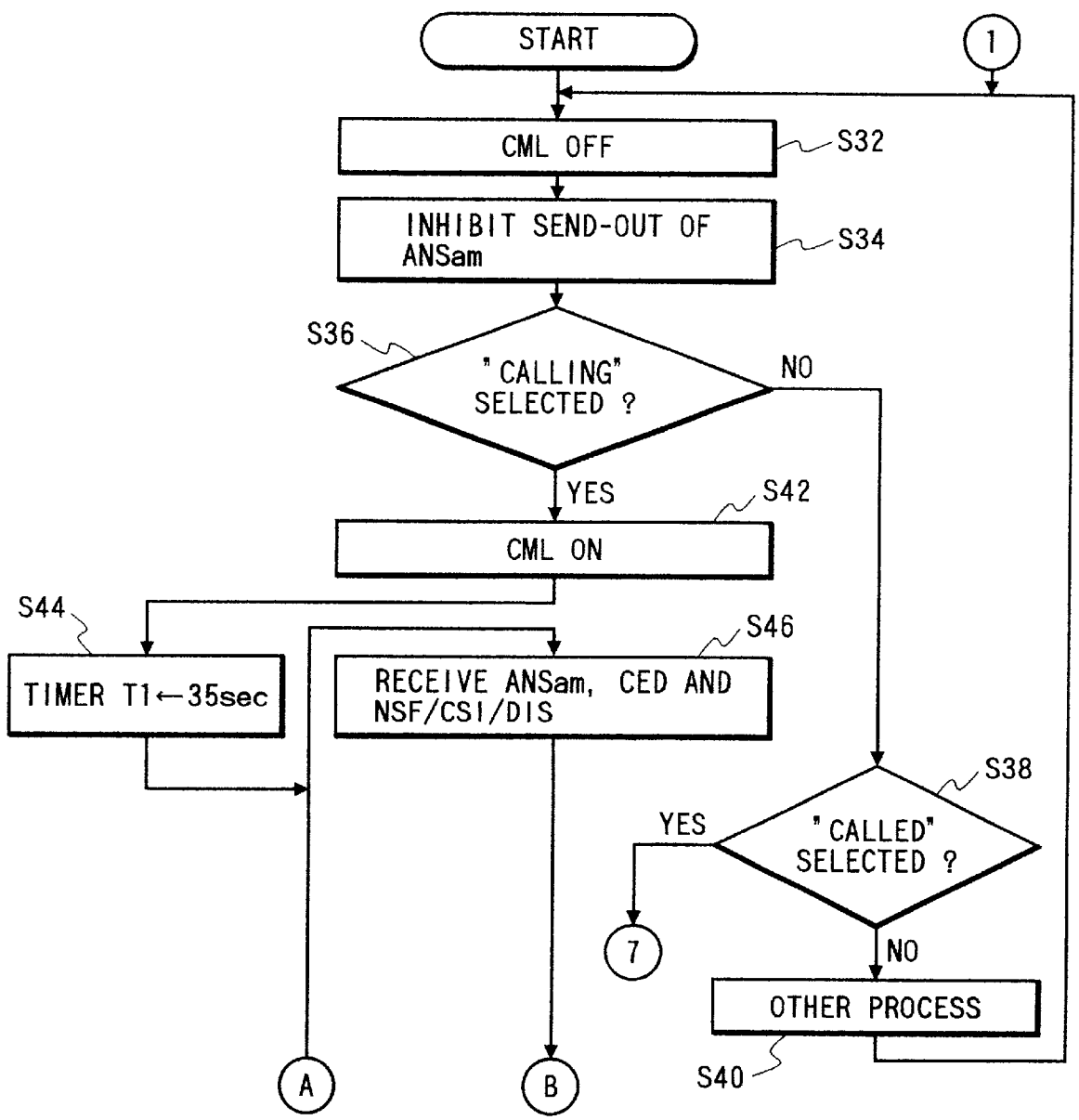

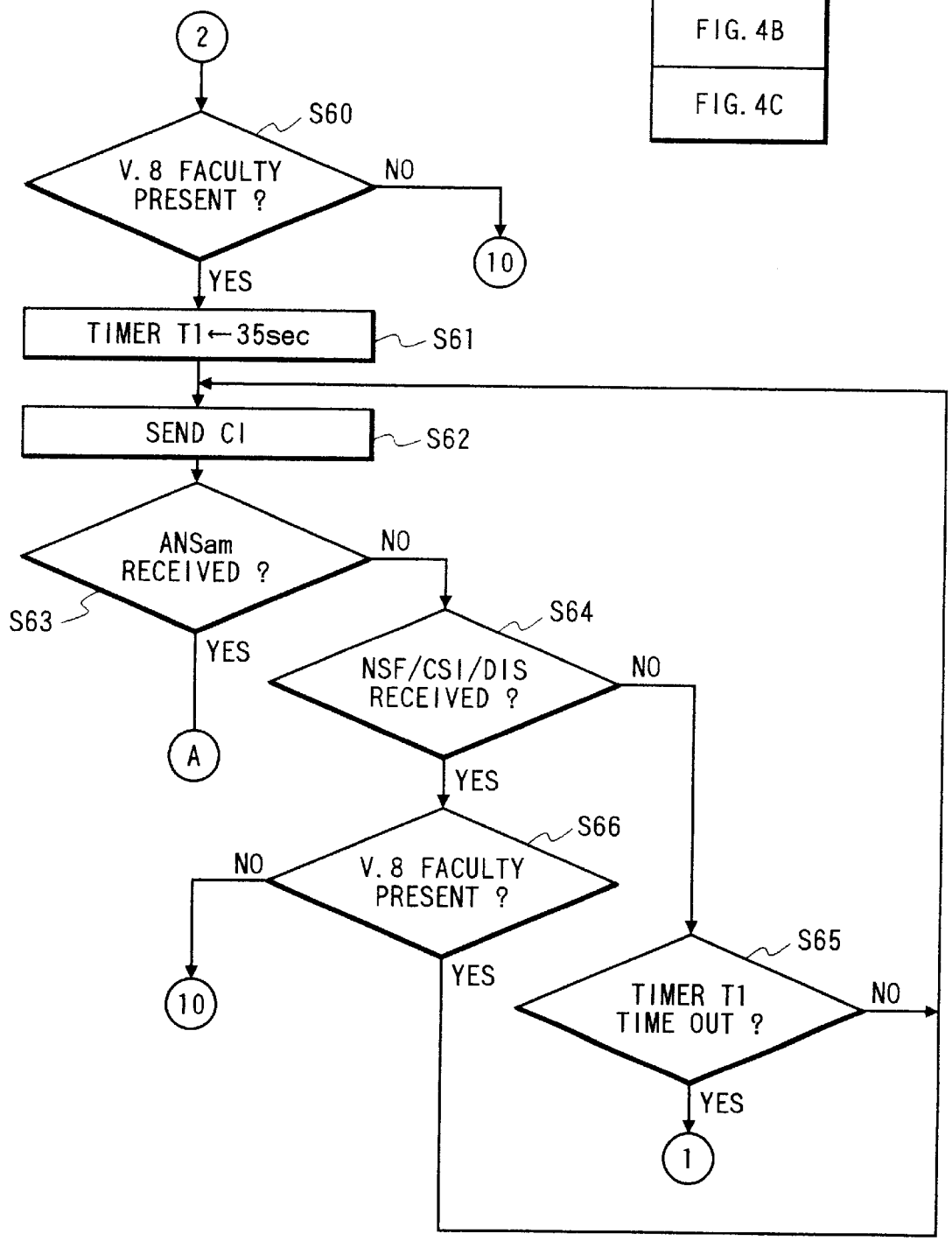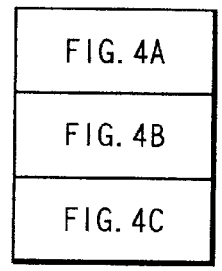

FACSIMILE APPARATUS HAVING V.8 PROTOCOL FACILITY AND FACSIMILE COMMUNICATION METHOD

BACKGROUND OF THE INVENTION

1. Field of the Invention

The present invention relates to a facsimile apparatus having a V.8 protocol for identifying a modem type and a facsimile communication method.

2. Related Background Art

Recently, various communications such as communication by a personal computer and facsimile communication have been conducted through a conventional public line. Various modems are used for such communications. Particularly, in the computer communication, unique communication is conducted by each manufacturer and the communication is not established unless same type of modems are used at a transmitting station and a receiving station. Thus, a protocol (V.8 protocol) for identifying types of modems at the transmitting station and the receiving station and indicating a common modem has been proposed.

The V.8 protocol is executed by a full duplex communication. A V.34 modem is selected by the V.8 protocol and a communication protocol is executed in the full duplex communication by the V.34 modem and the image communication is executed in a half duplex communication.

When the V.8 facility is provided in the facsimile apparatus, it is necessary to attain communication capability with a facsimile apparatus having only a conventional T.30 protocol and communication capability with a facsimile apparatus which is not provided the V.34 facility but is provided with the V.8 protocol.

SUMMARY OF THE INVENTION

It is an object of the present invention to improve a facsimile apparatus and a facsimile communication method.

It is another object of the present invention to allow proper execution of the V.8 protocol and the facsimile communication protocol.

It still another object of the present invention to provide a facsimile apparatus and a facsimile communication method which allow proper execution of the V.8 protocol even when a transmitting station is in a manual transmission mode and an input of a command to start the transmission is delayed.

In order to achieve the above objects, in accordance with the present invention, a first signal indicating a V.8 protocol is transmitted in response to the reception of a digital identification signal indicating the provision of a V.8 facility, the V.8 protocol is executed in response to the reception of a modulated tone signal of the V.8 protocol, and when the digital identification signal indicating the provision of the V.8 facility is received without receiving the modulated tone signal, the first signal is retransmitted. Thus, even if the communication of the first signal fails once, the V.8 protocol can be executed.

Other objects of the present invention will be apparent from the following description of the embodiments and the accompanying drawings.

DETAILED DESCRIPTION OF THE PREFERRED EMBODIMENTS

An embodiment of the present invention is now explained in detail with reference to the drawings.

Figure 1:
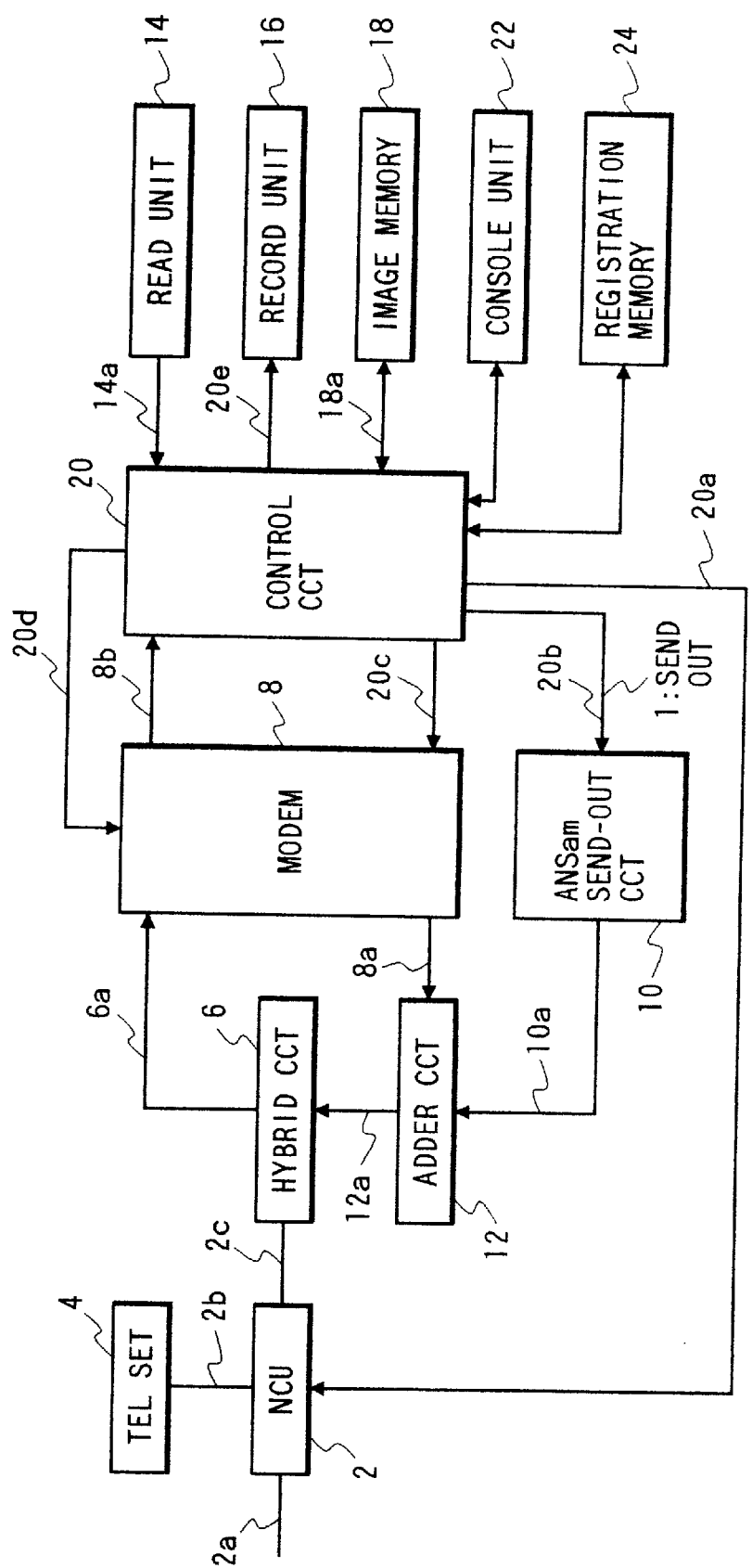
FIG. 1 shows a block diagram of a configuration of a facsimile apparatus in accordance with an embodiment of the present invention.

FIG. 1 shows a block diagram of a configuration of a facsimile apparatus in accordance with an embodiment of the present invention.

In FIG. 1, numeral 2 denotes an NCU (network control unit) which comprises a CML relay for selectively connecting a telephone line 2a of a public network to a telephone set 4 or a hybrid circuit 6, a loop forming circuit for forming a line loop of the telephone line 2a and a CI detection circuit for detecting a calling signal (CI signal) from the telephone line 2a.

The hybrid circuit 6 separates a signal in a transmission channel and a signal in a receiving channel.

Numeral 8 denotes a modem which demodulates a signal of the receiving channel from the hybrid circuit and outputs it to a control circuit 20 as digital data and modulates the digital data from the control circuit 20 and outputs it to the hybrid circuit 6 through an adder circuit 12 as the signal of the transmission channel. The modem 8 has the V.8, V.21 and V.34 facilities of the V Series Recommendation for modulation and demodulation of the protocol signal and the V.27ter, V.29, V.17 and V.34 facilities for modulating and demodulating the image signal. The modulation/demodulation systems and the transmission speed may be switched by a control signal from the control circuit 20.

Numeral 10 denotes an ANSam signal send-out circuit which disables an echo compressor or echo canceler facility of the public network and sends an ANSam signal (derived by modulating a signal of 2100 Hz) for transmitting and receiving the V.8 full duplex communication protocol signal to the line 2a through the adder circuit 12, the hybrid circuit 6 and the NCU 2. The ANSam signal send-out circuit 10 sends the ANSam signal in accordance with a control signal from the control circuit 20.

Numeral 14 denotes a read unit for reading a document sheet and numeral 16 denotes a record unit for recording an image signal as an image.

Numeral 18 denotes an image memory which stores read image data and received image data.

Numeral 20 denotes the control circuit which comprises a microcomputer, a ROM and a RAM. The control circuit 20 conducts the control of the read unit 14, the control of the record unit 16, the input control of various key signals from a console unit 22, the display control of a display provided on a console (or operation) panel 22, the coding/decoding of the image data (coding/decoding by MH, MR or MMR), the switching control of the modulation system of the modem 8, the switching control of the transmission speed, the signal transmission control of the ANSam signal send-out circuit 10 and the control of the transmission and reception of the protocol signal to be described later and the communication sequence of the image data communication.

An operation of the facsimile apparatus of the present embodiment is now explained.

Figure 2:
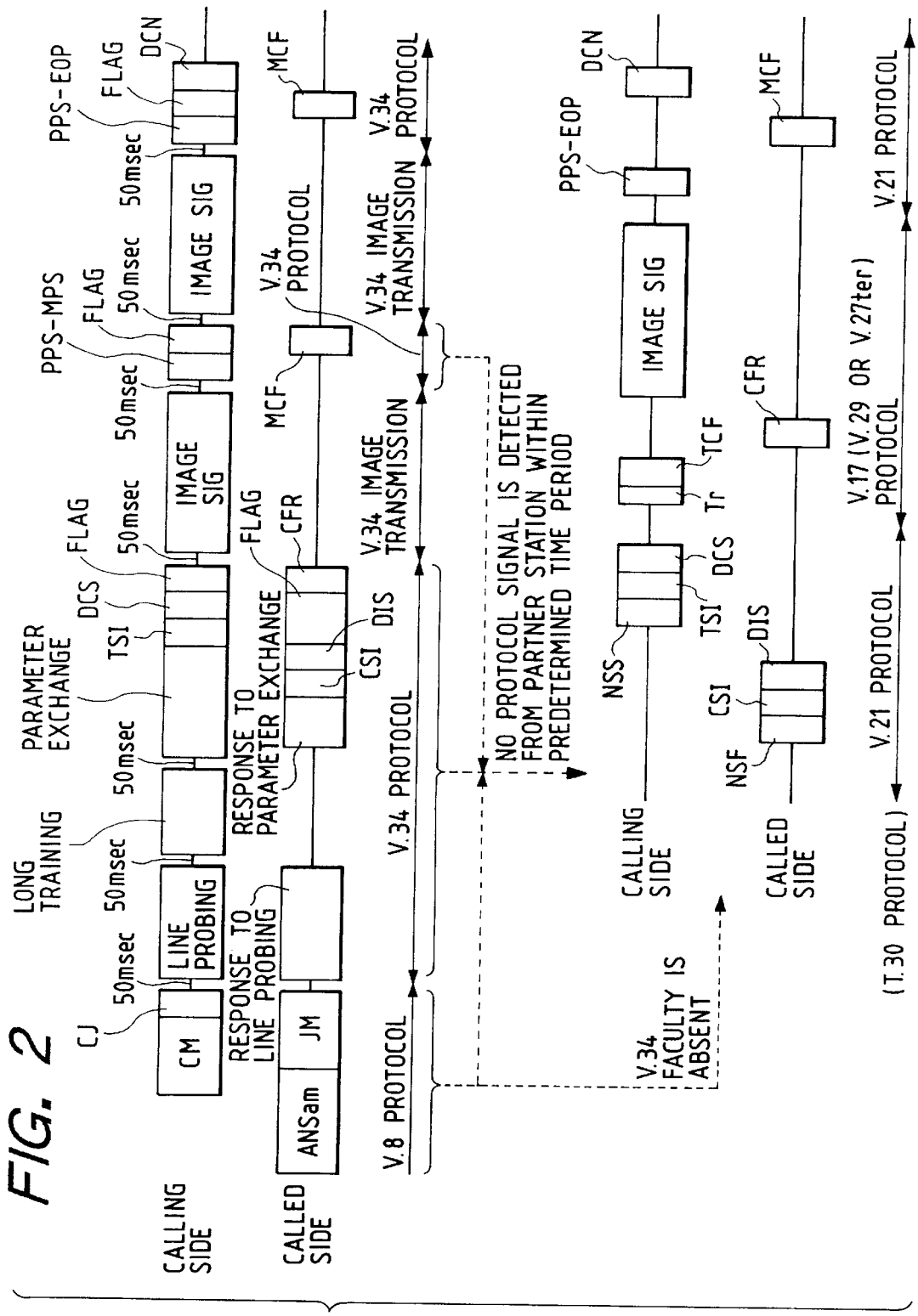
FIG. 2 shows a communication sequence in the embodiment, FIG. 3 which is composed of FIGS. 3A and 3B shows a flow chart of a control operation in the embodiment, FIG. 4 which is composed of FIGS. 4A, 4B and 4C shows a flow chart of a control operation in the embodiment.
Figure 3B:
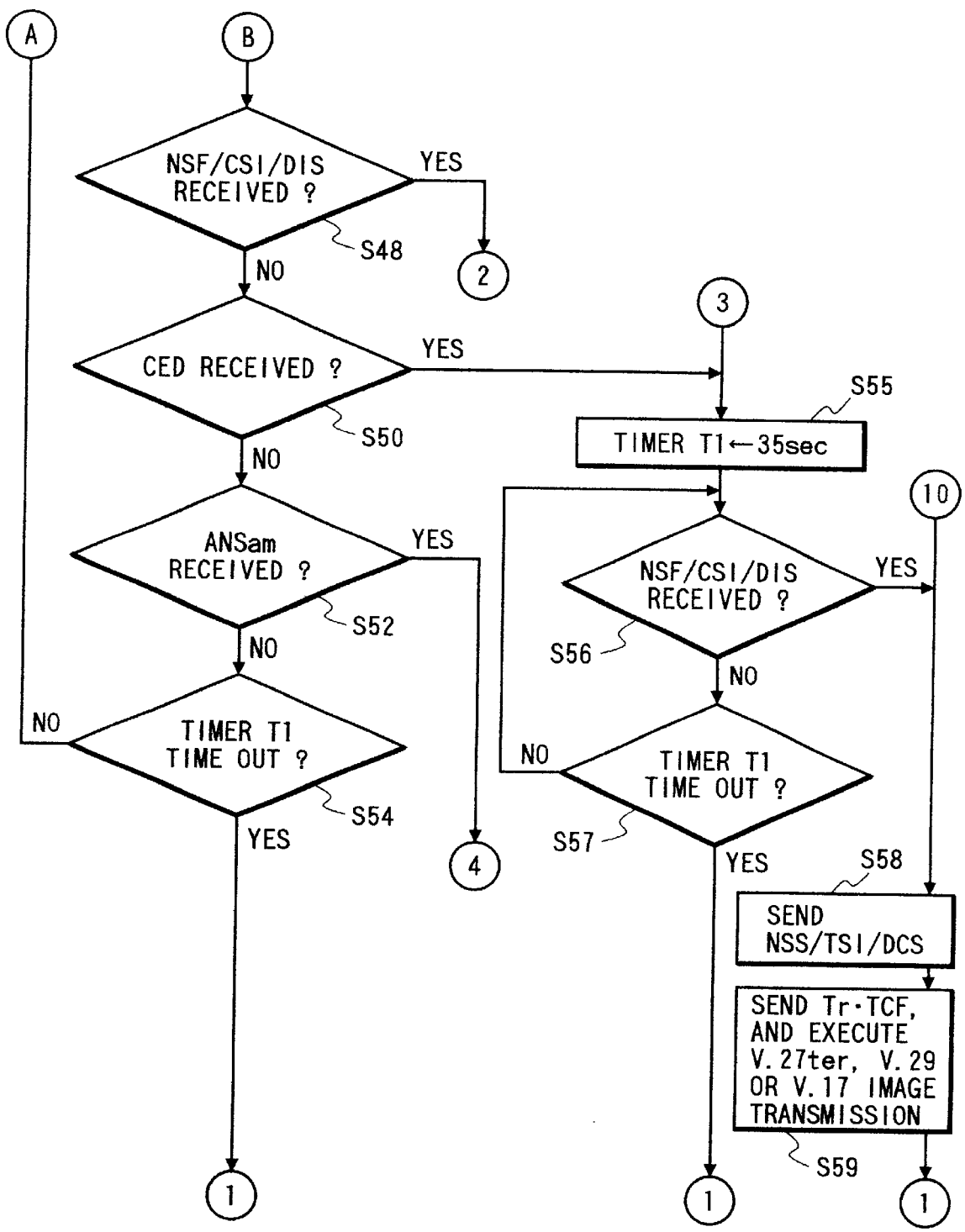
Figure 4B:
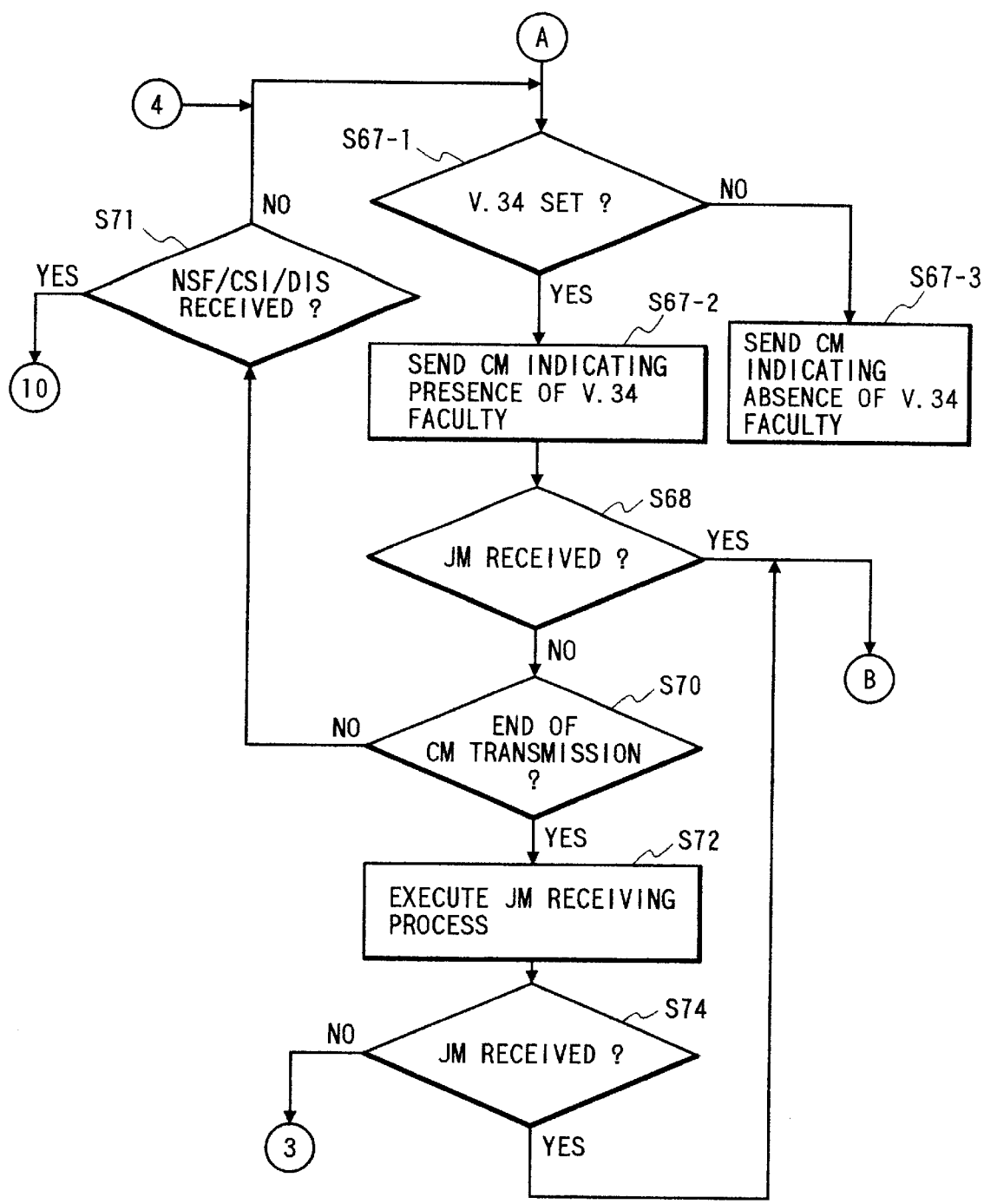
Figure 4C:
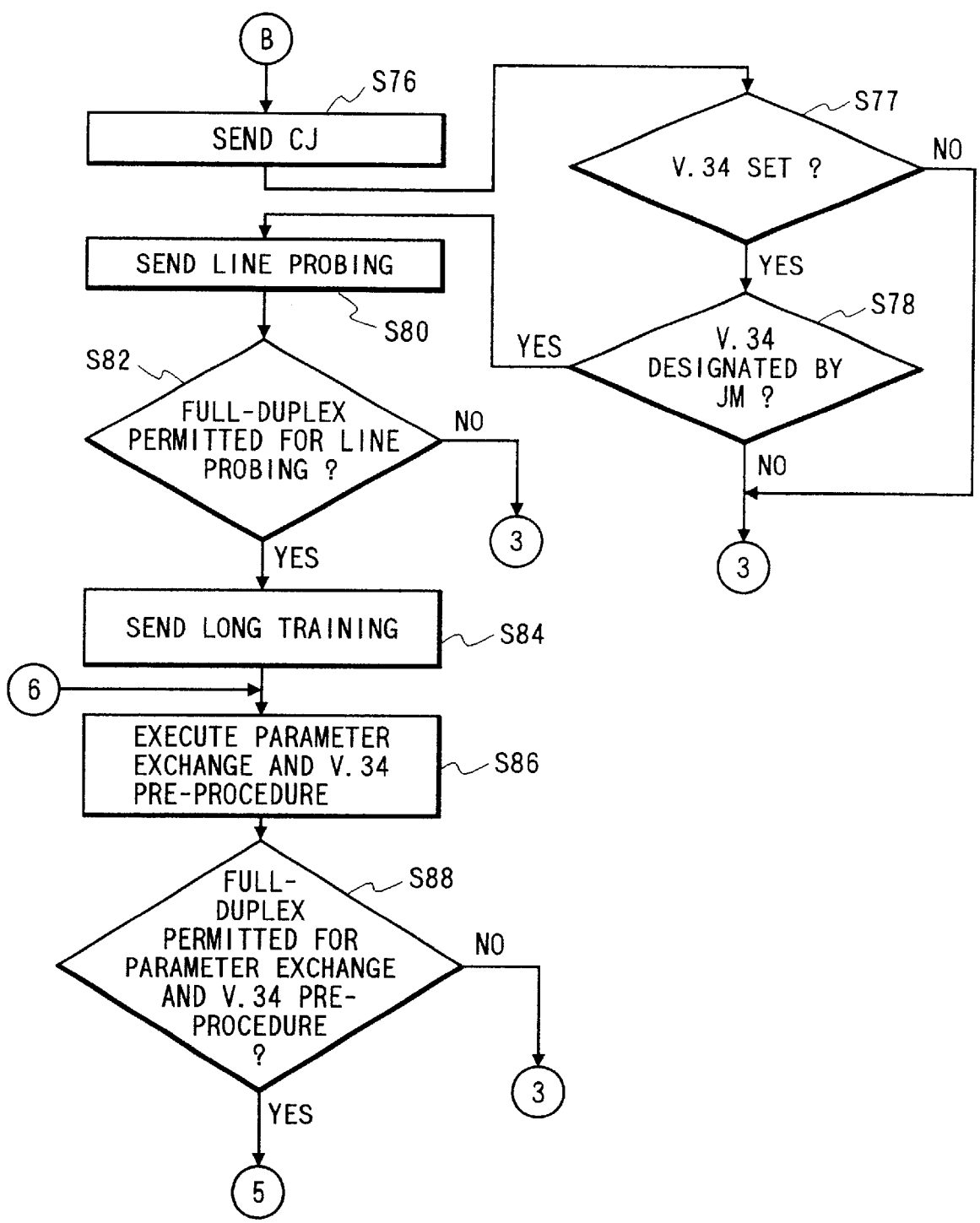
Figure 5:
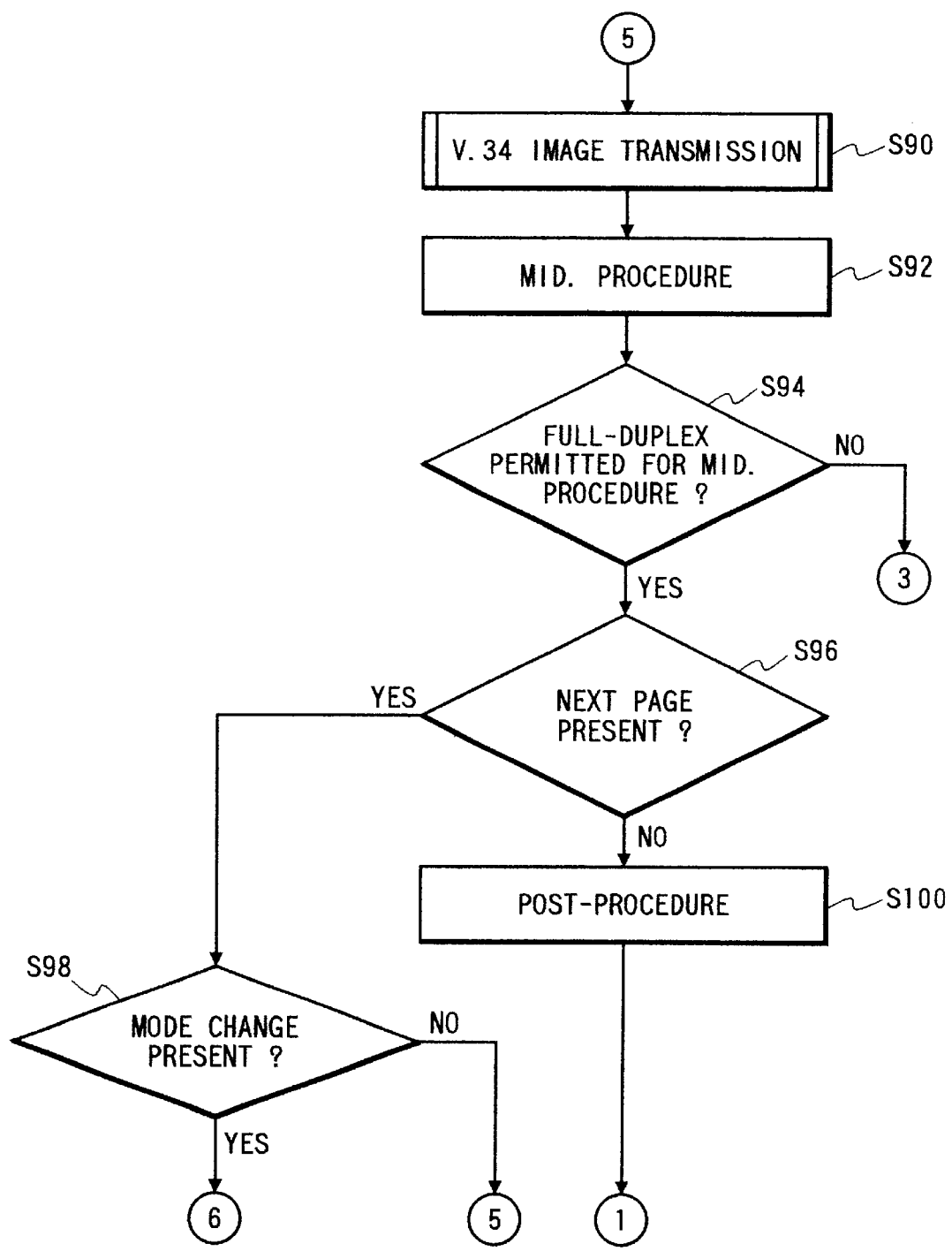
FIG. 5 shows a flow chart of a control operation in the embodiment, FIG. 6 which is composed of FIGS. 6A, 6B and 6C shows a flow chart of a control operation in the embodiment.

In the present embodiment, the protocol signal is transmitted and received in the full duplex communication. FIG. 2 shows a communication sequence in the present embodiment.

In response to the reception of a call, a called station sends the ANSam signal (derived by modulating 2100 Hz with 15 Hz) from the ANSam signal send-out circuit 10. By the ANSam signal, the echo compressor facility or the echo canceler facility of the public network is disabled and the full duplex communication is allowed. When a calling station receives the ANSam signal from the called station, it sends a CM (Call Menu) signal by the V.8 modulation and informs by the CM signal the types of modems owned by the apparatus to the called station. When the called station receives the CM signal, it stops to send the ANSam signal and sends a JM (joint Menu)-signal by the V.8 modulation. The called station informs by the JM signal the modem of selected by the called station, of the modems informed by the CM signal to the calling station. When the calling station receives the JM signal, it stops to send the CM signal and sends a CJ (CM terminator) signal by the V.8 modulation. The calling station informs by the CJ signal the modem determined based on the JM signal to the called station. When the called station receives the CJ signal, it stops to send the JM signal and starts to receive a probing signal from the calling station. If it is determined in the V.8 protocol that both the calling station and the called station do not have the V.34 modem (or one of them is not set to conduct the communication by V.34), the process is shifted to T.30 protocol.

On the other hand, the calling station sends the line probing signal (modulated by V.34) for checking the status of the line 2 after 50 msec from the stop of the sending of the CJ signal. Since the break of the signal is for 50 msec, the echo compressor or echo canceler facility of the public network is kept disabled. On the other hand, when the called station receives the line probing signal, it sends an acknowledgement (or response) signal (modulated by V.34) for the line probing signal and informs by the acknowledgement signal subsequent signal send level, correction of an amplitude level and a transmission report to the calling station, and proceeds to a reception process of a long training signal from the calling station.

When the calling station receives the acknowledge signal, it stops to send the line probing signal and sends the long training signal by the V.34 modulation after 50 msec from the stop of the sending. The called station executes by the long training signal the adjustment of an equalizer of the modem 8 and the detection of timing.

The calling station sends a parameter exchange signal by the V.34 modulation after 50 msec from the sending of the long training signal. When the called station receives the parameter exchange signal, it sends an acknowledge (or response) signal for the parameter exchange signal by the V.34 modulation and informs by the acknowledge signal a subsequent link correction and bit rate to the calling station. Following to the acknowledge signal for the parameter exchange signal, the called station sends a CSI (Called Subscriber Identification) signal and a DIS (Digital Identification Signal) signal of the T.30 Recommendation by the V.34 modulation, and also sends a flag (dummy signal) until it receives a TSI (Transmission Subscriber Identification) signal and a DCS (Digital Command Signal) of the T.30 Recommendation from the calling station.

When the calling station receives the CSI and DIS signals, it stops to send the parameter exchange signal, sends the TSI and DCS signals by the V.34 modulation and sends a flag until it receives a CFR (Confirmation to Receive) signal is received from the called station. On the other hand, when the called station receives the TSI and DCS signals from the calling station, it stops to send the flag and sends the CFR signal by the V.34 modulation.

When the calling station receives the CFR signal, it stops to send the flag and after 50 msec, it sends an image signal by the transmission mode preset in the previous protocol, and the called station receives the image signal be the preset transmission mode. The transmission and reception of the image signal may be an error transmission communication by the full duplex communication or an error transmission communication (ECM communication) by the half duplex communication.

When the calling station sends, after the transmission of one page of image signal, the next page of image signal in the same transmission mode, it sends a PPS (Partial Page Signal)-MPS (Multiple Page Signal) signal (for ECM (Error Correction Mode) of the T.30 Recommendation) after 50 msec from the end of the transmission of the image signal and sends a flag until it receives an MCF (Message Confirmation) signal from the called station. When the next page is to be transmitted by changing the transmission mode, the calling station sends a PPS-EOM (End of Message) signal instead of the PPS-MPS signal.

When the called station receives the PPS-MPS signal following to the image signal, it sends the MCF signal if the image signal is successfully received and proceeds to the reception process of the next page of image signal.

When the calling station receives the MCF signal, it stops to send the flag and after 50 msec, it sends the next page of image signal. If it is the final page, it sends the PPS-EOP (End of Procedure) signal after 50 msec from the end of the transmission of the image signal of that page and sends a flag until it receives the MCF signal from the called station. In the above communication process, since the signal break of 50 msec or longer does not occur, the echo compressor or echo canceler facility is kept disabled.

When the calling station receives the MCF signal from the called station, it stops to send the flag and sends a DCN (Disconnect) signal.

In the above V.8 and V.34 protocols, the calling station and the called station shifts to the protocol by the half duplex communication of the T.30 Recommendation if the acknowledge signal for the protocol signal sent to the destination station is not received within the predetermined time after the start of the sending of the protocol signal. In this case, the half duplex communication protocol is executed from the sending of the NSF, CSI and DIS signals by the called station.

In the above process, even if the protocol by the full duplex communication is no longer executed in the course of communication due to the reduction of the line quality, the remaining image signal may be communicated by the half duplex communication protocol by switching the communication to the half duplex communication so that proper image communication is attained without terminating the communication in error in the course of communication.

FIGS. 2, 3A, 3B, 4A, 4B, 4C, 5, 6A, 6B and 6C show flow charts of the control in the calling station (FIGS. 3A, 3B, 4A, 4B, 4C and 5) and the control in the called station (FIGS. 6A, 6B, 6C and 7).

In FIG. 3A, a signal of a signal level '0' is outputted to a signal line 20a in S32 to turn off the CML.

In S34, a signal of the signal level '0' is outputted to a signal line 20d to set the non-transmission of the ANSam signal.

In S36 and S38, whether the call or the receive has been selected is determined. If the call is received, the process proceeds to S42, and if the receive is selected, the process proceeds to S102. If neither the call or the receive is selected, the process proceeds to S40 to conduct other process.

In S42, a signal of a signal level '1' is outputted to the signal line 20a to turn on the CML.

In S44, a timer T1 is set to 35 seconds.

In S46, the ANSam signal, the CED signal and the NSF/CSI/DIS signals are received. In S48, S50, S52 and S54, the reception or non-reception is determined, if the NSF/CSI/DIS signals (V.21 signal) are received, the process proceeds to S60, and if the CED signal (2100 Hz signal) is received, the process proceeds to S55, if the ANSam signal (obtained by modulating 2100 Hz signal with 15 Hz) is received, the process proceeds to S67-1, and if T1 is not timed out, the process proceeds to S46 and if T1 is timed out, the process proceeds to S32.

In S55, the timer T1 is set to 35 seconds and in S56 and S57, the time-out of the timer T1 and the reception of the NSF/CSI/DIS signals are checked. If the NSF/CSI/DIS signals are received before the timer T1 is timed out, the process proceeds from S56 to S58 to send the NSS/TSI/DCS signals, and in S59, the training (Tr)·TCF signals are sent at the transmission speed of the modem preset by the DCS (V.27ter, V.29 or V.17) and the image signal is sent after the reception of the CFR signal.

In S60, whether the destination station receiver has the V.8 facility or not is determined by the DIS signal, and if it has the V.8 facility, the process proceeds to S61, and if it does not have the V.8 facility, the process proceeds to S58 to subsequently conduct the transmission of the image signal by the conventional T.30 protocol.

If the DIS signal received in S60 indicates the provision of the V.8 facility, the timer T1 is set to 35 seconds in S61 in order to shift to the V.8 protocol, and the CI (Call Indication) signal which is the V.8 protocol signal is sent in S62. (The CI signal causes the called station to send the ANSam signal of the V.8 protocol.) In S63, S64 and S65, the reception of the ANSam signal, the reception of the NSF (Non-Standard Facilities)/CSI/DIS signal and the time-out of the timer T1 are checked. If the ANSam signal is received before the time-out of the timer Ti, the process proceeds from S63 to S67-1, and if the NSF/CSI/DIS signals are received, the process proceeds from S64 to S66 to determine whether the received DIS signal indicates the provision of the V.8 facility or not. If the DIS signal indicates the provision of the V.8 facility in S66, it is determined that the destination station receiver could not receive the Ci signal and the CI signal is sent again in S62. Since the timer T1 is not set again at this time, the ANSam signal is not received whatever number of times the Ci signal is sent, and even if the DIS signal indicating the provision of the V.8 facility is continuously received, the communication may be terminated in error by the time-out of the timer T1 and a stand-by state may be restored. If the DIS signal received in S66 indicates non-provision of the V.8 facility, the process proceeds to S58 and the image is subsequently transmitted by the T.30 protocol.

When the ANSam signal is received and the process proceeds to S67-1, whether the apparatus is set to conduct the V.34 communication or not is determined in S67-1. This mode setting is conducted based on the key input from the console unit 22 and the mode information registered in a registration memory 24 is stored. The control circuit 20 determines whether the apparatus is set to conduct the V.34 communication or not by the mode information of the registration memory 24. If the apparatus is set to conduct the V.34 communication, the CM signal indicating the provision of the V.34 facility is sent in S67-2, and if the apparatus is not set to conduct the V.34 communication, the CM signal indication the non-provision of the V.34 facility is sent in S67-3. In S68, the reception of the JM signal in the V.8 protocol is checked, and if the JM signal is received, the process proceeds to S76, and if the JM signal is not received, the process proceeds to S70.

In S70, whether the transmission of the CM signal has been completed or not is determined, and if the transmission of the CM signal has not been completed, the reception of the NSF/CSI/DIS signals by V.21 is checked in S71. If the NSF/CSI/DIS signals are received in S71, the process proceeds to S58 to send the image signal by the T.30 protocol. If the transmission of the CM signal has been completed in S70, the process proceeds to S72 to continue the reception process of the JM signal for a predetermined period (no longer than 50 msec). In S74, the reception or non-reception of the JM signal is determined. If the JM signal is received, the process proceeds to S76 to send the CJ signal which is the V.8 signal. If the JM signal is not received in S74, it is determined that the full duplex communication is not allowed and the process proceeds to S55 to conduct the protocol based on V.21 (T.30 protocol).

Since the process proceeds to S76 when the JM signal is received for the transmission of the CM signal, the CJ signal is sent in S76 and the timer T1 is set to 35 seconds, and in S77, whether the apparatus is set to conduct the V.34 communication or not is determined, and if S78, whether the received JM signal designates the V.34 communication or not is determined. If the apparatus is set to conduct the V.34 communication and V.34 is designated by the JM signal, the process proceeds to S80 and the image is subsequently transmitted in the protocol based on V.34. If the apparatus is not set to conduct the V.34 communication or V.34 is not designated by the JM signal, the process proceeds to S55 and the image signal is subsequently transmitted by the T.30 protocol.

In S80, the transmission and the reception of the line probing signal are conducted. In S82, whether the full duplex communication of the line probing is allowed or not is determined, and if the full duplex communication is allowed, the process proceeds to S84 to execute the image transmission by the protocol based on V.34. If the full duplex communication of the line probing is not allowed in S82, the process proceeds to S55 to conduct the protocol based on V.21 (T.30 protocol).

In S84, the long training signal is transmitted.

In S86, a pre-protocol by the parameter exchange signal and the V.34 signal is conducted, and in S38, whether the full duplex communication of the parameter exchange signal and the V.34 signal in the pre-protocol is allowed or not is determined, and if it is allowed, the process proceeds to S90 to transmit the image by V.34 (the image signal is half duplex signal), and if the full duplex communication of the pre-protocol by the parameter exchange signal and the V.34 signal is not allowed, the process proceeds to S55 to conduct the protocol based on V.21 (T.30 protocol).

In S92, an intermediate (or middle) protocol by the V.34 signal is represented. In S94, if the full duplex communication of the intermediate protocol by the V.34 signal is allowed, the process proceeds to S96, and if the full duplex communication by the V.34 signal is not allowed (the acknowledgement signal is not received within the predetermined time from the start of the transmission of the protocol signal), the process proceeds to S55 to conduct the protocol based on V.21 (T.30 protocol).

In S96, whether the next page is present or not is determined, and if the next page is present, the process proceeds to S98, and if the next page is not present, the process proceeds to S100 to conduct a post protocol by the V.34 signal.

In S98, whether a mode change is included or not is determined, and if the mode change is included, the process proceeds to S86, and if the mode change is not included, the process proceeds to S90.

The control at the called station is now explained.

Figure 6:
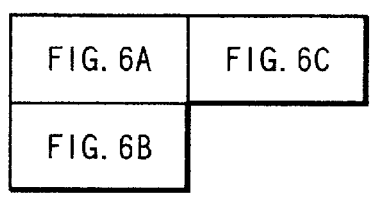
Figure 6A:
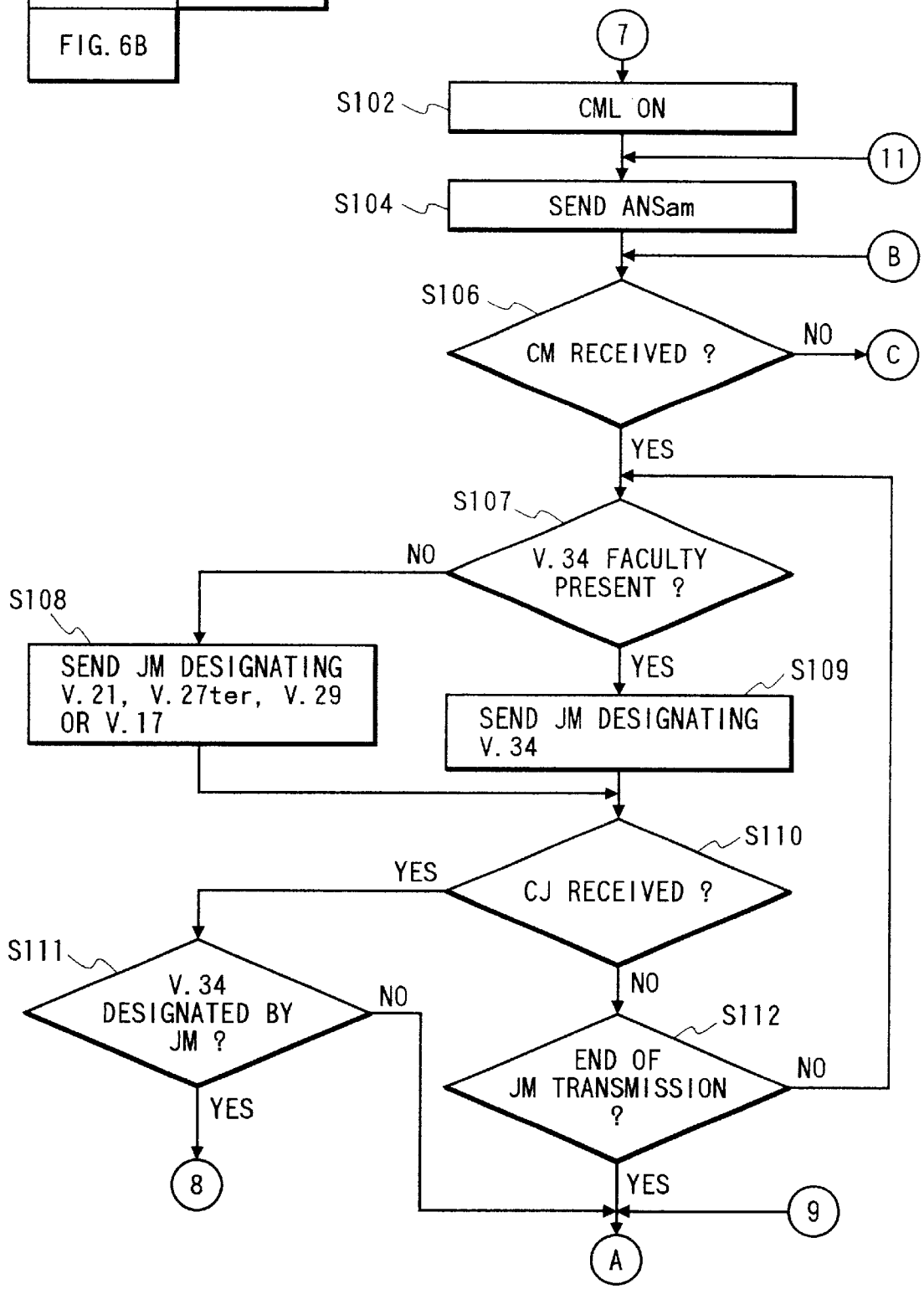
Figure 6B:
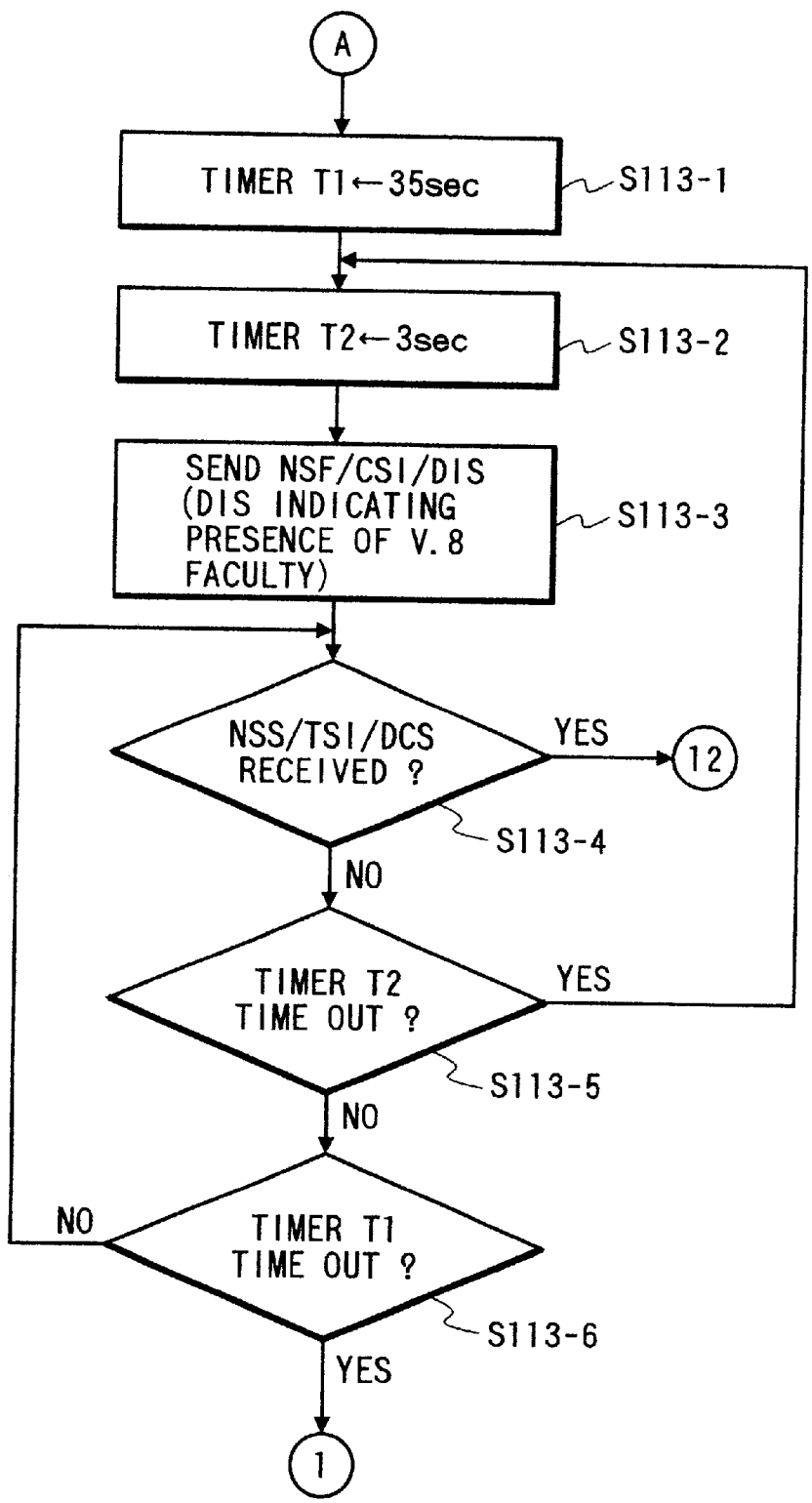
Figure 6C:
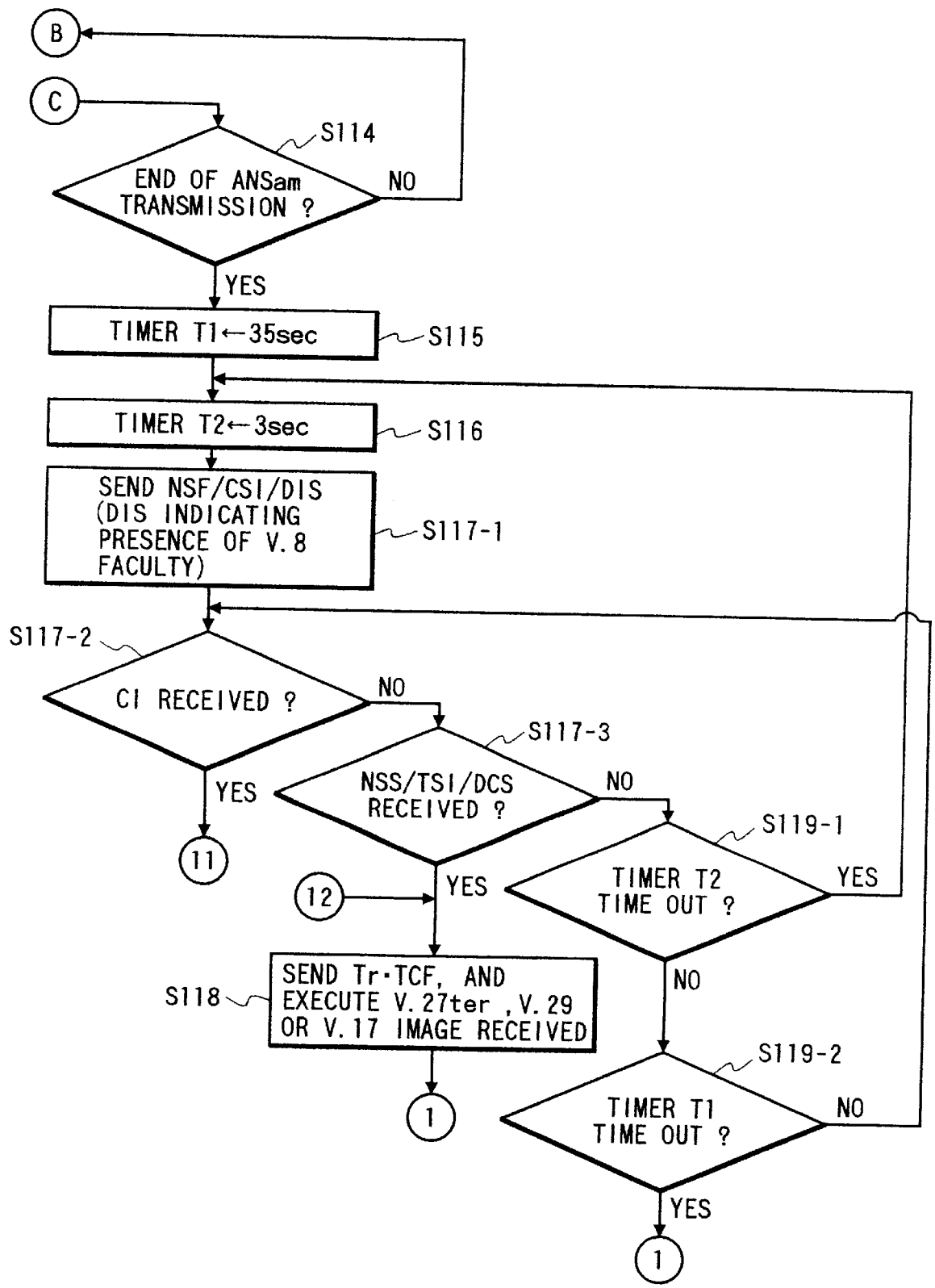
Figure 7:
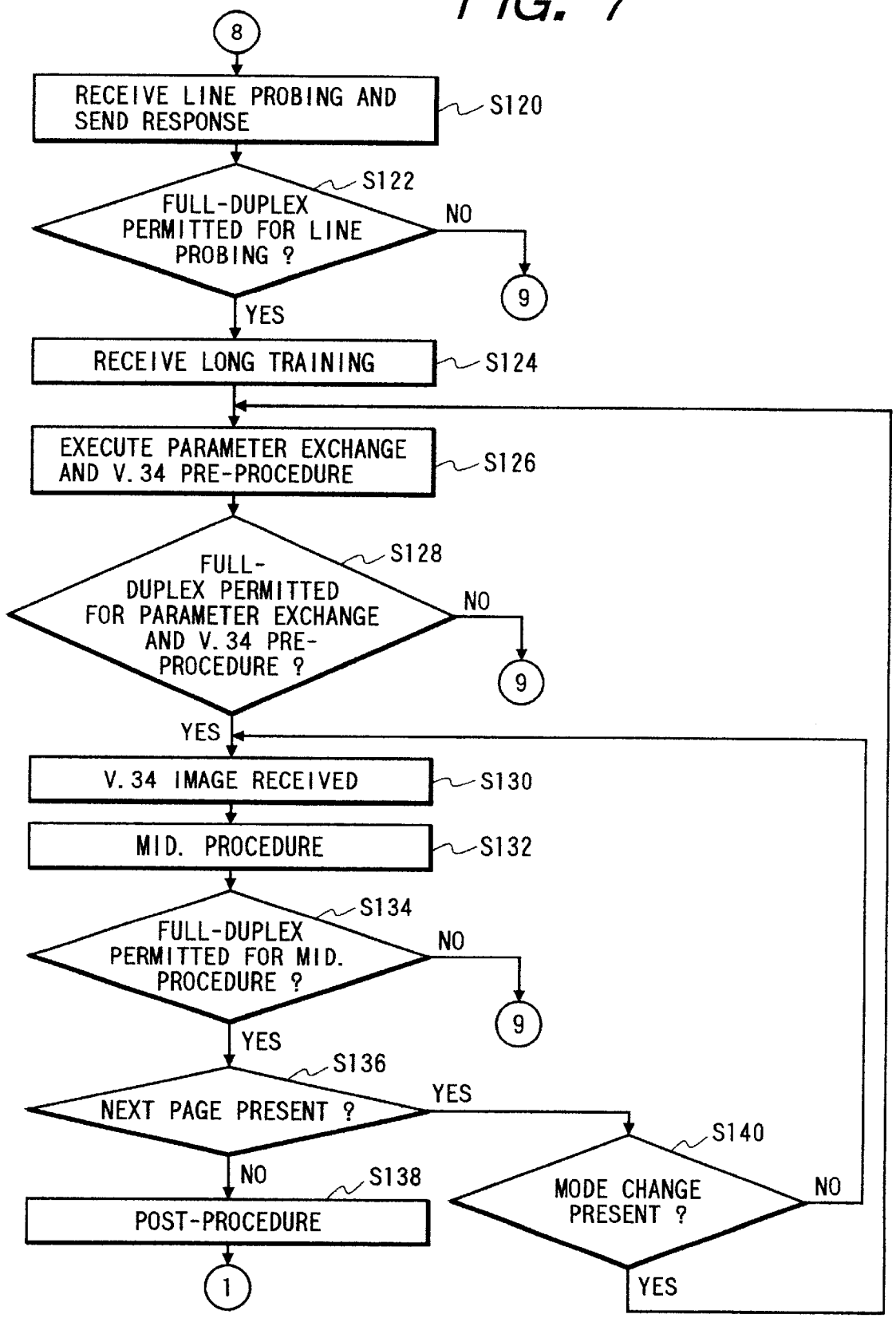
FIG. 7 shows a flow chart of a control operation in the embodiment.

In S102 of FIG. 6A, a signal of the signal level '1' is outputted to the signal line 20a to turn on the CML.

In S104, the transmission of the ANSam signal is started by the control of the signal line 20d.

In S106, the CM signal of the V.8 signal is received. When the CM signal is received before the end of the transmission of the ANSam signal (S114), the process proceeds to S107 to transmit the JM signal of the V.8 signal, and if the transmission of the ANSam signal is completed without receiving the CM signal, the process proceeds to S115.

When the CM signal is received during the transmission of the ANSam signal, the process proceeds to S107 to determine whether the received CM signal indicates the provision of the V.34 facility or not (whether the destination station receiver has the V.34 facility or not). If the destination station receiver has the V.34 facility, the transmission of the JM signal for designating V.34 is started in S109, and if the destination station receiver does not have the V.34 facility, the transmission of the JM signal for designating V.21 (or V.27ter, V.29 or V.17) is started in S108. In S110 and S112, the reception of the CJ signal and the completion of the transmission of the JM signal are checked. If the CJ signal is received before the completion of the transmission of the JM signal i.e. during the transmission of the JM signal, the process proceeds from S110 to S111, and if the transmission of the JM signal is completed without receiving the CJ signal, it is determined that the full duplex communication is not allowed and the process proceeds to S113-1 to shift to the reception process of the image signal by the T.30 protocol.

If the CJ signal is received, the process proceeds to S111 to determine whether the JM signal designates V.34 or not. If it designates V.34, the process proceeds to S120 to shift to the V.34 protocol and the reception process of the image signal by the V.34 protocol.

In S113-1, the timer T1 is set to 35 seconds, in S113-2, a timer T2 is set to 3 seconds, and in S113-3, the NSF/DSI/DIS signals are transmitted. At this time, the DIS signal designates the non-provision of the V.8 facility to prevent the destination station transmitter from repeating the V.8 protocol so that the quick and positive shift to the T.30 protocol is attained. In S113-4, S113-5 and S113-6, the reception of the NSS (Non-Standard Setup)/TSI/DCS signals, the time-out of the timer T2 and the time-out of the timer T1 are checked, and the NSF/CSI/DIS signals are transmitted at the interval of three seconds. If the NSS/TSI/DCS signals are received before the time-out of the timer T1, the process proceeds from S113-4 to S118 to receive the training (Tr) ·TCF (Training Certification) signal at the transmission speed of the modem designated by the received DCS signal (V.27ter, V.29 or V.17), and if the TCF signal is received successfully, the CFR signal is transmitted and the image signal is received at the transmission speed of the set modem.

If the CM signal is not received during the transmission of the ANSam signal (for approximately three seconds), the process proceeds from S114 to S115 to set the timer T1 to 35 seconds. In S116, the timer T2 is set to three seconds. In S117-1, the NSF/CSI/DIS signals are transmitted by V.21. At this time, the DIS signal designates the provision of the V.8 facility. Thus, the V.8 protocol may be resumed from the transmission of the CI signal when the ANSam signal is transmitted in response to the reception but the ANSam signal is not received because of the delay of the input timing of the manual transmission command by the calling station (destination station transmitter).

In S117-2, 117-3, 119-1 and 119-2, the reception of the CI protocol of the V.8 protocol, the reception of the NSS/TSI/DCS signals of V.21, the time-out of the timer T2 and the time-out of the timer T1 are checked. When the CI signal is received, the process proceeds from S117-2 to S104 to transmit the ANSam signal, and if the NSS/TSI/DCS signal is received, the process proceeds from S117-3 to S118 to receive the image signal by the T.30 protocol. When the timer T2 (three seconds) is timed out, the process proceeds from S119-1 to S116 to retransmit the NSF/CSI/DIS signals and transmit the NSF/CSI/DIS signals at the interval of three seconds. If neither the CI signal nor the NSS/TSI/DCS signals are received before the time-out of the timer T1, the communication is terminated in error and the process returns to a stand-by state. Alternatively, the number of times of sending the NSF/CSI/DIS signals (with the V.8 facility) transmitted in S117-1 may be counted, and if neither the CI signal nor the NSS/TSI/DCS signals are received before the end of the predetermined number of times (for example, five times) of sending, the process may proceed to S113-2 to transmit the DIS signal designating the non-provision of the V.8 facility. Thus, the communication may be shifted to the communication of the image signal by the T.30 protocol instead of terminating in error when the CI signal is not properly received from the destination station transmitter.

When the process proceeds from S111 to S120 to conduct the V.34 protocol and the V.34 communication, the reception of the line probing signal and the transmission of the acknowledge signal thereto are conducted in S120. In S122, if the full duplex communication of the line probing signal is allowed, the process proceeds to S124 to receive the long training signal, and if the full duplex communication of the line probing is not allowed, the process proceeds to S113-1.

In S124, the long training is received.

In S126, the parameter exchange signal and the V.34 pre-protocol are conducted. In S128, if the parameter exchange and the full duplex communication of the V.34 pre-protocol are allowed, the process proceeds to S130 to shift to the reception of the image signal by V.34. In S128, if the parameter exchange and the full duplex communication of the V34 pre-protocal are not allowed, the process proceeds to S113-1.

In S132, an intermediate protocol by the V.34 signal is executed. In S134, if the full duplex communication of the intermediate protocol by the V.34 signal is allowed, the process proceeds to S136, and if the full duplex communication of the intermediate protocol by the V.34 signal is not allowed, the process proceeds to S113-1.

In S136, whether the next page is present or not is determined, and if the next page is present, the process proceeds to S140, and if the next page is not present, the process proceeds to S138 to conduct a post protocol by the V.34 signal.

In S140, whether a mode change is included or not is determined, and if the mode change is included, the process proceeds to S126, and if the mode change is not included, the process proceeds to S130.

Figure 8:
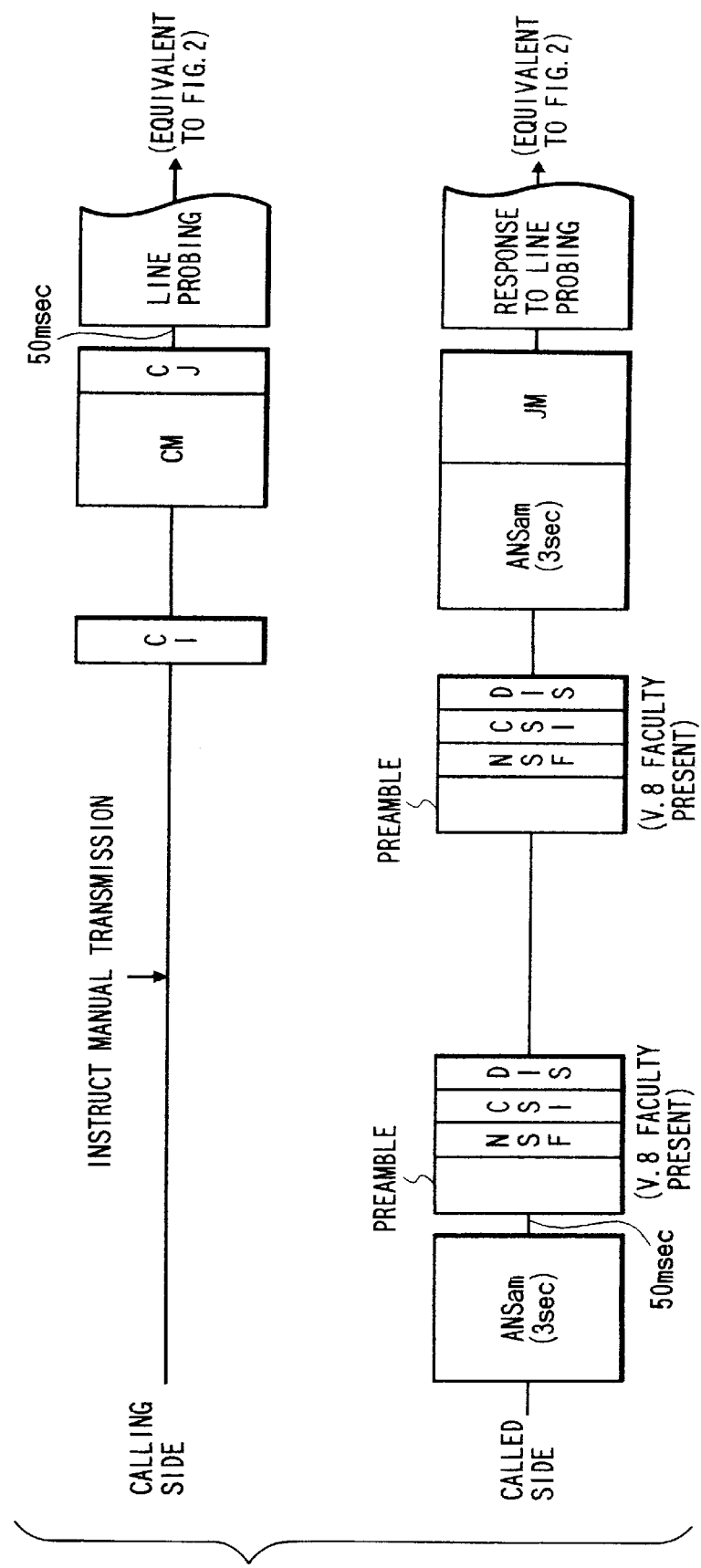
FIG. 8 shows a communication sequence when a manual transmission command is delayed.

By the above process, the communication sequence shown in FIG. 2 is executed in the calling station and the called station. FIG. 8 shows a communication sequence when the V.8 protocol is executed from the communication of the CI signal because of the delay of the input timing of the manual transmission command at the calling station.

In the above embodiment, when the calling station (transmitting station) transmits the CI signal in response to the reception of the DIS signal indicating the provision of the V.8 facility and the called station (receiving station) fails to receive the CI signal, the transmitting station retransmits the CI signal. When one of the transmitting station and the receiving station does not have the V.34 facility when the V.8 protocol is executed, the process is shifted to the T.30 protocol and the receiving station transmits the DIS signal indicating the non-provision of the V.8 facility (no declaration of the V.8 facility) so that the prompt and positive image signal communication by the T.30 protocol is attained.

Another embodiment of the present invention is now explained.

Figure 9:
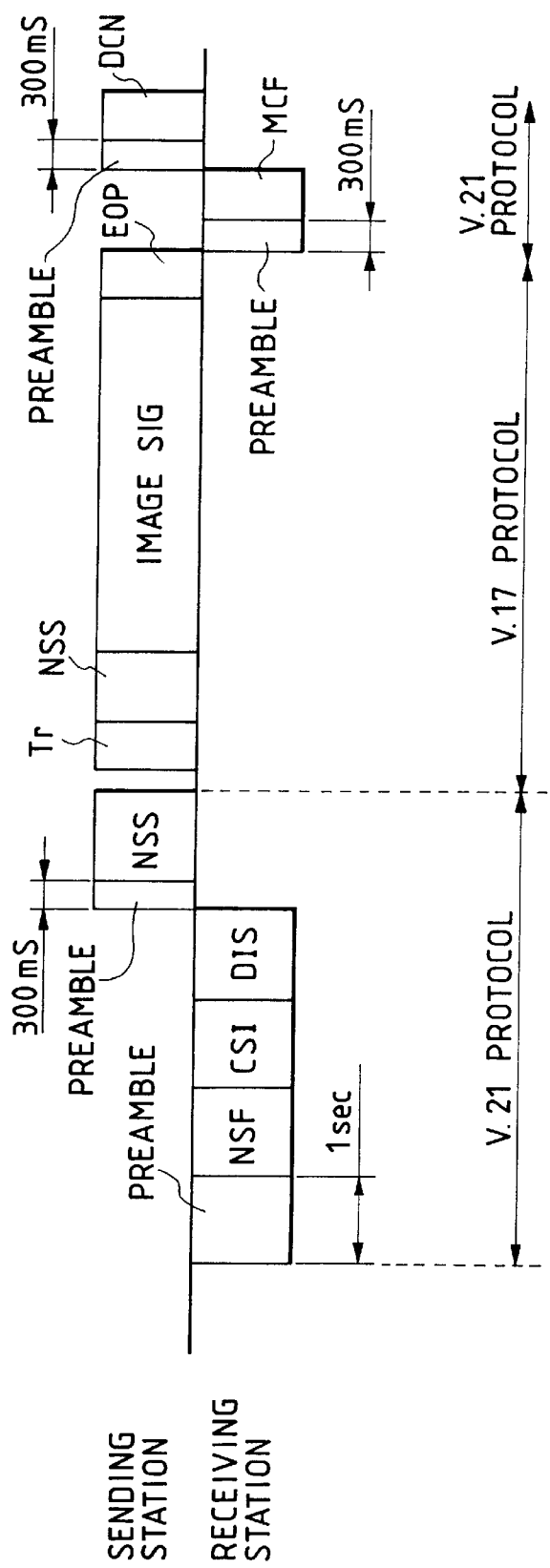
FIG. 9 shows a communication sequence of an abbreviated protocol.

A certain facsimile apparatus executes a special protocol (abbreviated protocol) which is different from the normal T.30 protocol. FIG. 9 shows an example of the special protocol (abbreviated protocol).

In FIG. 9, preamble, NSF, CSI and DIS signals transmitted by the receiving station are the V.21 signals and the transmission time of the preamble is one second which is same as that in the normal T.30 protocol. The presence or absence of the abbreviated protocol is informed to the transmitter by the NSF signal. When the abbreviated protocol is to be executed, the transmitter transmits the preamble and NSS signals of V.21. The time of the preamble is 300 msec. The NSS signal informs the general facility. Then, the process is shifted to the transmission of the Tr (training), NSS and image signals and the transmission of the EOP signal. The high speed NSS signal informs detailed facility. Then, the transmission of the preamble and MCF signals of V.21 from the receiver and the preamble and EOP signals from the transmitter is conducted. The time of the preamble is 300 msec. When the apparatus having such abbreviated protocol executes the communication sequence shown in FIG. 8, the receiving station may receive the NSS signal with the short preamble at the timing to receive the CI signal.

Accordingly, the receiving station must discriminate the CI signal and the NSS signal with the short preamble, but the discrimination at the receiving station is difficult because the signals patterns of the CI signal and the NSS signal with the short preamble are substantially identical. Thus, when the V.8 protocol is prioritized, the abbreviated protocol shown in FIG. 9 cannot be executed.

Thus, when the abbreviated protocol is prioritized and the NSF/CSI/DIS signals are to be transmitted following to the transmission of the first ANSam signal in the sequence of FIG. 8, the DIS signal indicating the non-provision of the V.8 facility is transmitted to prevent the CI signal from being transmitted from the transmitting station to allow the reception of the NSS signal with the short preamble.

Figure 10:
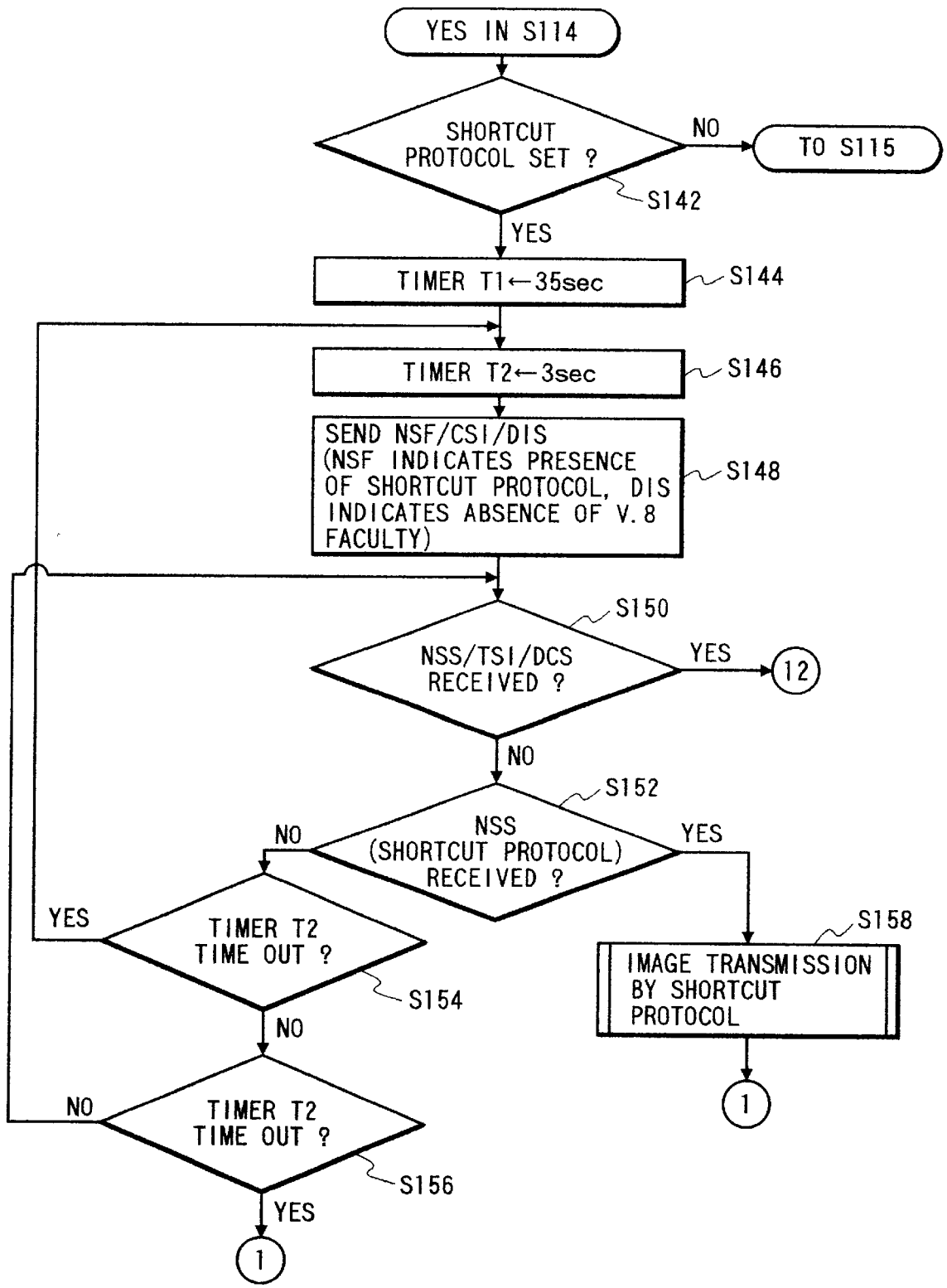
FIG. 10 shows a flow chart of a control operation in other embodiment.

FIG. 10 shows a flow chart of a control operation in the other embodiment. The steps S142 to S158 shown in FIG. 10 are added between S114 and S115 of FIG. 6C.

In S142, whether the abbreviated (or short-cut) mode prioritized mode is selected by the key input from the console unit 22 or not is determined. If it is not selected, the process proceeds to S115 of FIG. 6C, and if it is selected, the timer T1 is set to 35 seconds in S144, and the timer T2 is set to three seconds in S146. In S148, the NSF (designating the provision of the abbreviated (or short-cut) protocol facility)/ CSI/DIS (designating the non-provision of the V.8 facility) signals are transmitted. In S150, S152, S154 and S156, the reception of the NSS/TSI/DCS signals, the reception of the NSS signal of the abbreviated protocol, the time-out of the timer T2 and the time-out of the timer T1 are checked. The NSF/CSI/DIS signals are transmitted at the interval of three seconds, and when the normal NSS/TSI/DCS signals are received before the time-out of the timer T1, the process proceeds from S150 to S118 of FIG. 6C to shift to the reception of the image signal by the T.30 protocol, and when the NSS signal of the abbreviated protocol is received, the process proceeds from S152 to S158 to conduct the reception process of the image signal by the abbreviated protocol of FIG. 9. When the timer T1 is timed out, the process proceeds to S32 of FIG. 3A to return to the stand-by state.

In accordance with the other embodiment described above, the execution of the abbreviated protocol is attained.

In accordance with the above-embodiment, the V.8 protocol may be properly executed. Further, prompt and proper shift from the V.8 protocol to the T.30 protocol is attained.

The present invention is not limited to the above embodiments but various modifications thereof may be made.

What is claimed is:

1. A facsimile communication method comprising the steps of:

transmitting a first signal indicating a V.8 protocol a first time in response to reception of a digital identification signal including information indicating provision of a V.8 facility;

executing the V.8 protocol in response to reception of a modulated tone signal of the V.8 protocol; and transmitting the first signal a second time when the digital identification signal including the information indicating the provision of the V.8 facility is received a second time without receiving the modulated tone signal, wherein, in response to reception of the digital identification signal including the information indicating the provision of the V.8 facility, and after it is detected through use of the V.8 protocol that a V.34 protocol cannot be executed, a T.30 protocol is executed without executing the V.34 protocol.

2. A facsimile communication method according to claim 1, further comprising the step of:

conducting image communication by the T.30 protocol when the digital identification signal is received a second time after the reception of the modulated tone signal.

3. A facsimile communication method according to claim 1, further comprising the step of:

terminating communication when the modulated tone signal is not received within a predetermined time period from the first transmission of the first signal.

4. A facsimile communication method according to claim 1, further comprising the step of:

conducting image communication by the T.30 protocol when a digital identification signal including information indicating non-provision of the V.8 facility is received after transmission of the first signal.

5. A facsimile communication method according to claim 1, further comprising the step of:

conducting image communication by the V.34 protocol when both a transmitting station and a receiving station have a V.34 facility when the V.8 protocol is to be executed.

6. A facsimile communication method comprising the steps of:

executing a V.8 protocol; and transmitting a digital identification signal including information indicating non-provision of a V.8 facility when V.8 protocol communication with a partner station is established, while transmitting a digital identification signal information indicating provision of the V.8 facility when the V.8 protocol communication with the partner station is not established, in a case where at least one of a transmitting station and a receiving station does not have a V.34 facility, to execute communication by a T.30 protocol.

7. A facsimile apparatus having a V.8 protocol and a T.30 protocol, comprising:

a control unit adapted to conduct the V.8 protocol; and a transmission unit adapted to transmit a digital identification signal including information indicating non-provision of a V.8 facility, when V.8 protocol communication with a partner station is established, while transmitting a digital identification signal information indicating provision of the V.8 facility when the V.8 protocol communication with the partner station is not established, in a case where at least one of a transmitting station and a receiving station does not have a V.34 facility to execute communication by the T.30 protocol.

8. A facsimile apparatus according to claim 7, further comprising:

an identification signal transmission unit adapted to transmit a digital identification signal including information indicating provision of the V.8 facility after transmission of a modulated tone signal of the V.8 protocol during reception.

9. A facsimile apparatus according to claim 8, further comprising:

a reception unit adapted to receive a first signal indicating the V.8 protocol; and a tone signal transmission unit adapted to transmit a modulated tone signal in response to reception of the first signal.

10. A facsimile apparatus according to claim 9, further comprising:

a receiver adapted to receive a second signal similar to the first signal;

a communication unit adapted to execute a special communication protocol different from the V.8 protocol and the T.30 protocol in response to reception of the second signal;

a selection unit adapted to select the special communication protocol; and an identification signal transmission unit adapted to transmit the digital identification signal including the information indicating the non-provision of the V.8 facility in response to a selection of the special communication protocol.

11. A facsimile apparatus, comprising:

a transmission unit adapted to transmit a first signal indicating a V.8 protocol a first time in response to reception of a digital identification signal including information indicating provision of a V.8 facility; and a control unit adapted to execute the V.8 protocol in response to reception of a modulated tone signal of the V.8 protocol, wherein said transmission unit transmits the first signal a second time when the digital identification signal including the information indicating the provision of the V.8 facility is received a second time without receiving the modulated tone signal, and wherein, in response to reception of the digital identification signal including the information indicating the provision of the V.8 facility, and after it is detected through use of the V.8 protocol that a V.34 protocol cannot be executed, a T.30 protocol is executed without executing the V.34 protocol.

12. A facsimile apparatus according to claim 11, further comprising an image communication unit adapted to conduct image communication by the T.30 protocol when the digital identification signal is received a second time after the reception of the modulated tone signal.

13. A facsimile apparatus according to claim 11, further comprising a communication termination unit adapted to terminate a communication when the modulated tone signal is not received within a predetermined time period from the first transmission of the first signal.

14. A facsimile apparatus according to claim 11, further comprising an image communication unit adapted to conduct image communication by the T.30 protocol when a digital identification signal including information indicating non-provision of the V.8 facility is received after transmission of the first signal.

15. A facsimile apparatus according to claim 11, further comprising an image communication unit adapted to conduct image communication by the V.34 protocol when both said apparatus and a receiving station have a V.34 facility when the V.8 protocol is to be executed.

16. A facsimile communication method according to claim 6, further comprising the step of transmitting a digital identification signal including information indicating provision of the V.8 facility after transmission of a modulated tone signal of the V.8 protocol during reception.

17. A facsimile communication method according to claim 16, further comprising the step of receiving a first signal indicating the V.8 protocol and a step of transmitting a modulated tone signal in response to reception of the first signal.

18. A facsimile communication method according to claim 17, further comprising the steps of:

receiving a second signal similar to the first signal;

executing a special communication protocol different from the V.8 protocol and the T.30 protocol in response to reception of the second signal;

selecting the special communication protocol; and transmitting the digital identification signal including the information indicating the non-provision of the V.8 facility in response to the selection of the special communication protocol.

19. A communication method comprising the steps of:

executing a first-protocol; and executing a second-protocol without executing the first-protocol when first-protocol communication with a partner station is established and a second-protocol signal that includes information indicative of provision of a first-protocol facility is received from the partner station, executing the first-protocol when the first-protocol communication with the partner station is not established and the second-protocol signal that includes the information indicative of the provision of the first-protocol facility is received from the partner station, or executing either the second protocol or a third-protocol after the first-protocol communication with the partner station is established.

20. A method according to claim 19, wherein the first-protocol is a V.8 protocol and the second-protocol is a T.30 protocol.

21. A communication apparatus comprising:

a first-protocol processing unit adapted to execute a first-protocol; and a second-protocol processing unit adapted to execute a second-protocol without executing the first-protocol, when a first-protocol communication with a partner station is established and a second-protocol signal that includes information indicative of provision of a first-protocol facility is received from the partner station, to execute the first protocol when the first-protocol communication with the partner station is not established and the second-protocol signal that includes the information indicative of the provision of the first-protocol facility is received from the partner station, or to execute either the second protocol or a third-protocol after the first-protocol communication with the partner station is established.

22. An apparatus according to claim 21, wherein the first-protocol is a V.8 protocol and the second-protocol is a T.30 protocol.

23. A facsimile communication method comprising the steps of:

transmitting a first signal indicating a V.8 protocol a first time in response to reception of a digital identification signal that includes information indicating provision of a V.8 facility;

executing the V.8 protocol in response to reception of a modulated tone signal of the V.8 protocol to establish the V.8 protocol;

transmitting a digital command signal when the digital identification signal that includes the information indicating provision of the V.8 facility is received a second time, after executing the V.8 protocol; and executing either a T.30 protocol or a V.34 protocol following establishment of the V.8 protocol.

24. A method according to claim 23, further comprising the step of:

transmitting the first signal a second time when the digital identification signal including the information indicating provision of the V.8 facility is received a second time without receiving the modulated tone signal.

25. A communication method comprising the steps of:

transmitting a first signal indicating a first protocol a first time in response to reception of a second signal that includes information indicating provision of a first protocol facility;

executing the first protocol in response to reception of a third signal of the first protocol;

transmitting a fourth signal of a second protocol when the second signal that includes the information indicating the provision of the first protocol facility is received a second time, after executing the first protocol; and executing either the second protocol or a third protocol following establishment of the first protocol, wherein the first protocol and the second protocol are different from each other.

26. A method according to claim 25, further comprising the step of:

transmitting the first signal a second time when the second signal including the information indicating provision of the first protocol facility is received a second time without receiving the third signal.

27. A facsimile communication apparatus comprising:

a transmission unit adapted to transmit a first signal indicating a V.8 protocol a first time in response to reception of a digital identification signal that includes information indicating provision of a V.8 facility;

a control unit adapted to execute the V.8 protocol in response to reception of a modulated tone signal of the V.8 protocol, to establish the V.8 protocol, and to execute either a T.30 protocol or a V.34 protocol following establishment of the V.8 protocol, wherein said transmission unit transmits a digital command signal when the digital identification signal that includes the information indicating provision of the V.8 facility is received a second time, after executing the V.8 protocol.

28. An apparatus according to claim 27, wherein said transmission unit transmits the first signal a second time when the digital identification signal including the information indicating provision of the V.8 facility is received a second time without receiving the modulated tone signal.

29. A communication apparatus comprising:

a transmission unit adapted to transmit a first signal indicating a first protocol a first time in response to reception of a second signal that includes information indicating provision of a first protocol facility; and a control unit adapted to execute the first protocol in response to reception of a third signal of the first protocol, and to execute either the second protocol or a third protocol following establishment of the first protocol, wherein said transmission unit transmits a fourth signal of a second protocol when the second signal that includes the information indicating provision of the first protocol facility is received a second time, after executing the first protocol, and wherein the first protocol and the second protocol are different from each other.

30. An apparatus according to claim 29, wherein said transmission unit transmits the first signal a second time when the second signal including the information indicating provision of the first protocol facility is received a second time without receiving the third signal.

* * * * *